July 14, 1925.
J. HARE
SANITARY SPOUT
Filed Dec. 21, 1923
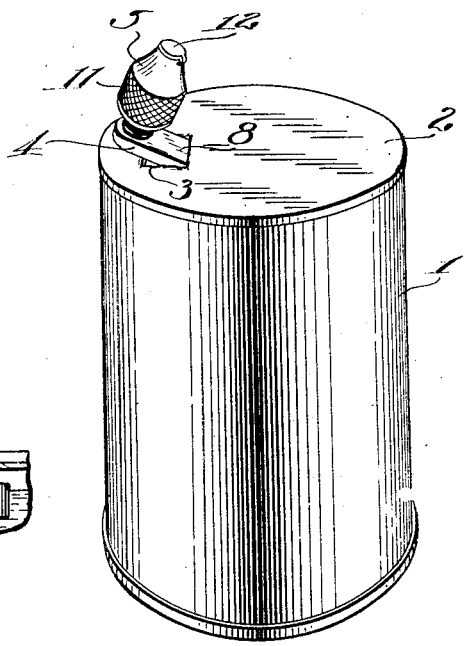
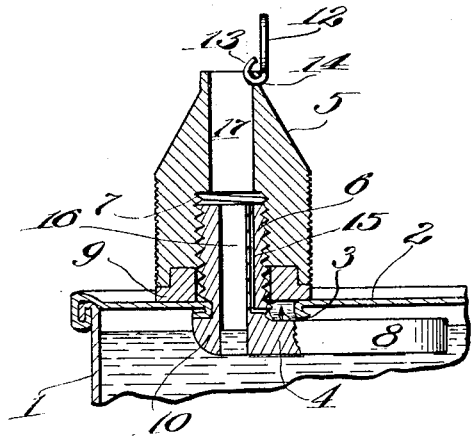
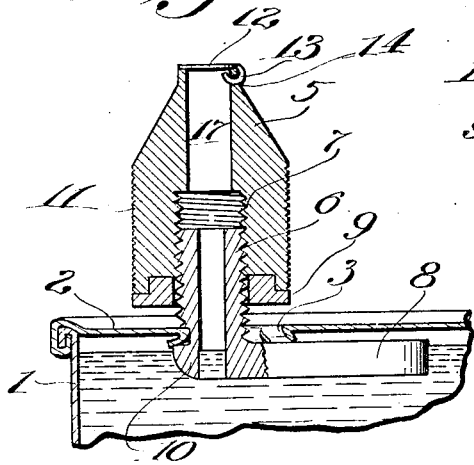
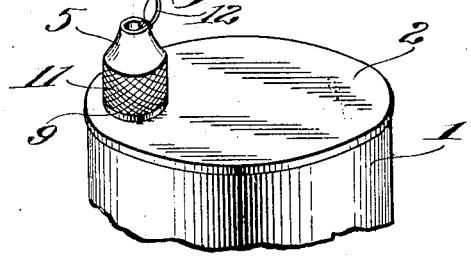
Inventor
James Hare
by Hazard and Miller
Att'ys Patented July 14, 1925.

1,546,343

UNITED STATES PATENT OFFICE.

JAMES HARE, OF TUJUNGA, CALIFORNIA.

SANITARY SPOUT.

Application filed December 21, 1923. Serial No. 681,954.

*To all whom it may concern:*

Be it known that I, JAMES HARE, a citizen of the United States, residing at Tujunga, in the county of Los Angeles and State of California, have invented new and useful Improvements in Sanitary Spouts, of which the following is a specification.

My present invention being referred to as a sanitary spout, it may be understood to be an object of this invention to provide a removable spout suitable for convenient application to a receptacle unprovided with means for the withdrawal of its contents.

It being customary to sell milk products, oil, and the like, in ordinary tin cans, completely closed and not provided with spouts or removable covers, it is an object of this invention to provide a spout which may be manufactured and sold as a separate article of commerce, but which can be readily applied to a can containing condensed milk or a salad or cooking oil, or the like, to facilitate the withdrawal of a pre-determined quantity of the contents thereof; and the preferred embodiment of my invention may comprise an inner member and an outer member secured together by a threaded connection, each of said members being preferably provided with a longitudinal aperture through which contents of a can may be delivered and one of said members being preferably provided with a gasket or other means for effecting a fluid-tight joint between the surface of a can and my novel sanitary spout.

It is a further object of my invention to povide a sanitary spout of the general character referred to with means for the optional closure of a longitudinal passage extending therethrough.

It is a further object of my invention to provide a sanitary closure capable of being seated in an aperture roughly cut through a sheet metal surface, such as the end of a tin can; and, in a preferred embodiment of my invention one of the cooperative members of my sanitary spout may be provided with means to prevent rotation thereof in consequence of relative movement intended to secure my novel spout in an aperture such as may be provided therefor by any convenient tool such as a jackknife or can-opener.

It is a further object of my invention to provide a sanitary spout comprising an inner member provided with a nipple adapted to engage an outer member and provided not only with a projection to prevent the rotation of said inner member but also with a shoulder adapted, upon suitable adjustment of said inner member after the insertion of the same through a roughly cut opening, to cooperate with an opposing member in securely seating and retaining my spout in its intended position and relationships.

Other objects of my invention will appear from the following description of a prefered embodiment thereof, taken in connection with the appended claims and the accompanying drawing, in which:

Figure 1 is a perspective view showing the mode of introduction of my novel spout through a roughly cut aperture provided as by means of a jackknife in the end of a tin can.

Figure 2 is a view showing my sanitary spout as successively seated in one end of a tin can.

Figure 3 is a vertical section on a somewhat enlarged scale showing intended relationships of the parts thereof immediately after the inner element of my novel spout has been inserted and retracted within an aperture in the end of a tin can, or the like, and before the outer member thereof has been screwed down to effect a tight joint.

Figure 4 is a view corresponding to Figure 3, but showing the mentioned outer member as screwed down into fluid-tight contact with the outer surface of the sheet metal end of a can, a cap or cover upon the end of said outer member being shown as elevated in readiness for the delivery of a fluid therethrough.

Referring to the details of that specific embodiment of my invention chosen for purposes of illustration, 1 may be a tin can provided with a usual sheet metal top 2, in which a substantially longitudinal opening 3 may be cut by any convenient means, such as a jackknife or can-opener, this opening being preferably no broader than may be necessary to permit the insertion of the inner member of my novel sanitary spout therethrough.

Although the inner member 4 and the outer member 5 of my novel sanitary spout may be of any desired suitable configuration, and although they may be cut in any preferred manner, I consider it advantageous to employ an inner member 4, L-shaped in elevational outline, the upright or stem portion of this L-shaped member being preferably in the form of a nipple 6, exteriorly threaded to engage an interior thread 7, within the outer member 5; and the lower or horizontal portion of the inner member 4 may advantageously constitute a horizontal projection 8 of sufficient length to prevent the free rotation of said member within a can, or the like, and during the tightening of the outer member 5, in the manner of a nut thereon.

In order that the tightening of the outer member 5 upon the inner member 4, in the manner described, shall be effective to produce a fluid-tight joint, one of the mentioned members, and preferably the outer member 5, may advantageously be provided with a washer or gasket 9, inset or otherwise removably or permanently secured thereto, a gasket in the position referred to, being adapted to contact with the comparatively smooth and perfect outer surface of a can end; and, in order to press this outer surface into effective engagement with the mentioned gasket, or its equivalent, I may advantageously provide the inner member 4 with a shoulder 10, shown as extending oppositely to the projection 8, the upper surfaces of both the shoulder 10 and the projection 8 being preferably flat and adapted after said inner member is inserted through a suitable opening and retracted therein, to cooperate in an engagement of the inner surface of the can end and thereby in the compression of the gasket 9 against the outer surface thereof. The outer member 5 may advantageously be provided with a milled surface 11 to facilitate the rotation thereof relatively to the inner member 4; and I may optionally provide on the upper end of the outer member 5 a closure element such as the cover plate 12, shown as secured by a rebent projection 13, extending through a suitable aperture 14 in a manner permitting the pivotal movement of said cover and serving to prevent the accidental loss or displacement of the same.

From the foregoing it will be obvious that I have provided a comparatively simple sanitary spout, capable of being manufactured and sold at a moderate price, and capable of being easily and quickly applied to any ordinary can, or the like, from which a liquid is to be dispensed; and, in order to adapt the same to use upon cans containing comparatively thick or viscous liquids, whose exit may be dependent upon a simultaneous admission of air, I may advantageously provide the inner member 4 with a duct or pore 15, shown as extending substantially parallel with the passage 16 through the nipple 6, the passage 16 being shown as of less diameter than the passage 17, constituting a prolongation thereof through the outer member 5.

By having the passage 17 of greater diameter than the passage 16, it will be noted that the stream of liquid being discharged from the receptacle will not completely occupy the passage 17. In other words, the stream of liquid has its diameter determined by the diameter of the passage 16, and upon passing into the passage 17 does not completely fill the latter passage. This enables air to enter the passage 16 about the stream of liquid and to pass into the receptacle through the pore or duct 15.

Although I have herein described one complete embodiment of my invention, it should be understood that various features thereof might be independently employed, and also that various modifications might be made by those skilled in the art without a departure from the spirit and scope of my invention, as the same is indicated above and in the following claims.

What I claim is:

1. A sanitary spout comprising a nipple having a base portion adapted to be inserted into a receptacle, said nipple having a passage therethrough and being exteriorly threaded, an outer member threaded on to said nipple and having a passage therethrough forming a continuation of the passage in said nipple, said outer member and nipple being adapted to cooperate to clamp a portion of said receptacle therebetween, and a hinged closure cap for closing the passage in said outer member.

2. A sanitary spout comprising an L-shaped nipple having its base portion adapted to be inserted into a receptacle, a passage formed in said nipple, an outer member threaded on to said nipple and having a passage forming a continuation of the passage in said nipple, a hinged closure cap carried by said outer member, the passage in said outer member being of greater diameter than the passage in said nipple, and a duct formed in said nipple communicating with the passage in said outer member and with said receptacle.

3. A sanitary spout comprising an outer member provided with an interior thread and with an inset gasket, and an inner member in the form of an L-shaped body comprising a nipple having an external thread and comprising also a lateral projection to prevent rotation thereof, said L-shaped body being provided with a shoulder adapted to engage the inner surface of a can end, and also with a plurality of ducts, differing in size, extending longitudinally of said nipple.

4. A sanitary spout comprising an outer member provided with an interior thread and with an inset gasket, and an inner member in the form of an L-shaped body comprising a nipple having an external thread and comprising also a lateral projection to prevent rotation thereof, said L-shaped body being provided with a shoulder adapted to engage the inner surface of a can end, and also with a plurality of ducts, differing in size, extending longitudinally of said nipple, both of said ducts connecting with a larger duct extending through said outer member.

In testimony whereof I have signed my name to this specification.

JAMES HARE.